US012747310B2

(12) United States Patent
Kaya et al.

(10) Patent No.: US 12,747,310 B2
(45) Date of Patent: Sep. 29, 2026

(54) pH-INDEPENDENT POLYDOPAMINE SYNTHESIS METHOD UNDER VISIBLE LIGHT

(71) Applicant: İSTANBUL TEKNİK ÜNİVERSİTESİ, Sisli/İstanbul (TR)

(72) Inventors: Kerem Kaya, Besiktas/Istanbul (TR); Saniye Feyza Ergün, Maltepe/Istanbul (TR)

( * ) Notice: Subject to any disclaimer, the term of this patent is extended or adjusted under 35 U.S.C. 154(b) by 627 days.

(21) Appl. No.: 18/248,106

(22) PCT Filed: Dec. 31, 2021

(86) PCT No.: PCT/TR2021/051689

§ 371 (c)(1),
(2) Date: Apr. 6, 2023

(87) PCT Pub. No.: WO2022/154770

PCT Pub. Date: Jul. 21, 2022

(65) Prior Publication Data

US 2023/0399424 A1 Dec. 14, 2023

(51) Int. Cl.
*C08F 134/00* (2006.01)

(52) U.S. Cl.
CPC .................................. *C08F 134/00* (2013.01)

(58) Field of Classification Search
CPC ... C08F 134/00; B01J 19/123; C08G 73/0672
See application file for complete search history.

(56) References Cited

U.S. PATENT DOCUMENTS

2014/0221522 A1* 8/2014 Antoni .................... A61L 31/10
523/105

FOREIGN PATENT DOCUMENTS

| | | | | |
|---|---|---|---|---|
| CN | 106317442 | A | 1/2017 | |
| EP | 1431315 | A2 * | 6/2004 | ............ A61K 6/891 |
| EP | 2950832 | B1 | 8/2018 | |
| KR | 20130031163 | B1 | 12/2013 | |
| WO | 2014118382 | A1 | 8/2014 | |
| WO | 2014132012 | A1 | 9/2014 | |

OTHER PUBLICATIONS

Bielawski (M. Bielawski, Diaryliodonium Salts Development of Synthetic Methodologies and α-Arylation of Enolates, Stockholm University, 2011).*
International Search Report for corresponding PCT/TR2021/051689 dated Feb. 18, 2022.
Written Opinion of the International Searching Authority for corresponding PCT/TR2021/051689 dated Feb. 18, 2022.
Marcin Bielawski, Diaryliodonium Salts Development of Synthetic Methodologies and α-Arylation of Enolates, Stockholm University, 2011 1.2 Some λ3- and λ5-lodanes and their Applications, 1.3.3 Application Areas.

* cited by examiner

*Primary Examiner* — Kumar R Bhushan
(74) *Attorney, Agent, or Firm* — Egbert, McDaniel & Swartz, PLLC

(57) ABSTRACT

A pH-independent synthesis method for synthesizing polydopamine, which can be carried out under visible light and/or daylight.

3 Claims, 1 Drawing Sheet

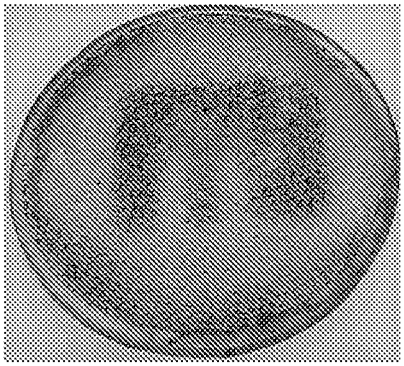

pH-INDEPENDENT POLYDOPAMINE SYNTHESIS METHOD UNDER VISIBLE LIGHT

FIELD OF THE INVENTION

The present invention relates to a pH-independent synthesis method for the production of polydopamine, which can be carried out under visible and/or daylight.

STATE OF THE ART

In the state of the art, studies on the synthesis of polydopamine are performed, under high-energy UV light[1], in medium pH: 8[2] or by oxidative polymerization[3] using catalysis. High-energy UV light is used instead of visible light or sunlight in these studies, this leads to high cost. In addition to this, a buffer solution called TRIS must be used to ensure that the pH of the medium remains at 8 in these methods[1, 2]. Oxidants such as $FeCl_3$ are required in the oxidative polymerization method.[3] Also, complex electrolysis systems are required for the electropolymerization method[5]. These methods, which are currently being applied in the state of the art, are impractical applications in terms of energy, environment and health. Simple, easy-to-apply and sustainable new methods that do not require high economic costs are required in the technical field.

The International patent application with publication number EP2950832 B1 is found in the patent and literature research made in the direction of the state of the art. Said patent document relates to hydrophilic coatings containing polydopamine as a coating material for many industrial products (substrates), including medical devices, analyzers, membranes and fabrics, and methods of preparation of such coatings. pH is adjusted in the range of 4-10 and TRIS buffer solution is used in the method described in the document Polydopamine polymer and vegetable oil-containing coating material and the production method of said coating material are disclosed in the international patent application with publication number WO2014132012 A1. Buffer solution is used so as to adjust the pH in said document.

As a result, due to the abovementioned disadvantages and the insufficiency of the current solutions regarding the subject matter, a development is required to be made in the relevant technical field.

BRIEF DESCRIPTION OF THE INVENTION

The present invention relates to polydopamine synthesis method which fulfills the abovementioned requirements, eliminates all disadvantages and brings some additional advantages.

The main aim of the invention is to develop a method for obtaining polydopamine from a dopamine solution in any pH environment under visible light or daylight in a short period of 2-4 hours without the need for TRIS buffer solution and/or high-energy UV light. It is possible to produce polydopamine in a much more cost-effective way compared to the applications in the state of the art with the help of the inventive method. The invention provides independence from pH from this aspect, it recommends the use of low-energy visible light (400-700 nm) or daylight without the need for any light source instead of high-energy and costly UV light. The necessity of using buffer solution is also eliminated since the method allows polymerization independent of pH.

Another aim of the invention is to provide a faster and less harmful synthesis method compared to conventional oxidative polymerization. At the same time, the difficult experimental conditions required by electropolymerization are eliminated with the invention.

Another aim of the invention is to obtain a method that allows pattern forming by means of masking. It is possible to pattern only the desired regions by appropriate masking in the invention. The desired pattern can be applied to any surface by using photomask.

Another aim of the invention is to provide easily controllable polymerization. The polymerization can be controlled more easily in the present invention since the it is carried out with light, the surface adhesion properties achieved in the prior art methods can also be achieved by the developed method.

The structural and characteristic features of the present invention will be understood clearly by the following detailed description. Therefore the evaluation shall be made by taking this detailed description into consideration.

FIGURES CLARIFYING THE INVENTION

An example photo pattern view is given in FIG. 1.

DETAILED DESCRIPTION OF THE INVENTION

In this detailed description, the inventive polydopamine synthesis method is described only for clarifying the subject matter in a manner such that no limiting effect is created.

The present invention relates to a synthesis method for synthesizing polydopamine. The method uses the ability of diphenyliodonium to oxidize dopamine. Accordingly, dopamine is easily oxidized to obtain polydopamine. Dopamine reacts with diphenyliodonium in the presence of at least one photostimulant under visible light and/or sunlight in the inventive method. An aromatic hydrocarbon that absorbs light in the visible region can be used as a photostimulant. Visible light and/or daylight are low-energy lights, they minimize the energy required to obtain polydopamine. The predicted photoelectron transfer mechanism is as follows:

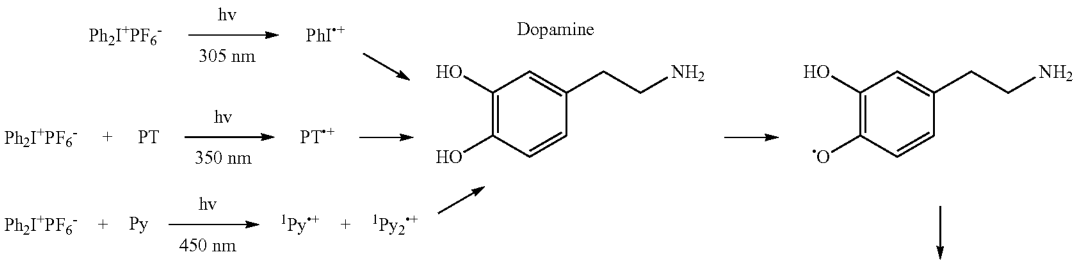

-continued

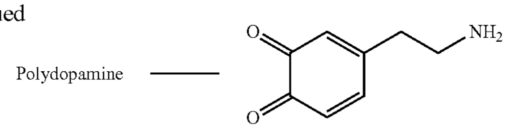

$Ph_2I^+PF_6^-$: Iodonium salt
PT: Phenothiazine photostimulant
Py: Pyrene photostimulant In a preferred embodiment of the invention, concentrated (50 mM) dopamine. HCl ethanol solution in the presence of appropriate photostimulant (0.01 eq) dopamine in a 1:1 molar ratio: It is reacted with DPI (diphenyliodonium salt) for 2 or 4 hours in a Shlenk tube under the visible light or sunlight and nitrogen atmosphere. The dark brown/black particles formed after the reaction are washed with alcohol and filtered. The filtered dark solids are preferably dried in a vacuum incubator at 50° C. for 1 day. Polydopamine formation can be achieved by using the above-mentioned components under nitrogen gas on any surface instead of a Schlenk tube, if desired, by using visible light or daylight.

Polydopamines are used for coating purposes in different fields of industry. They also allow surfaces to become bioactive in the field of biology. They are effective in increasing the protective effect of the surfaces and ensuring adhesion regardless of the surface. As a form of application, depending on the thickness desired to be coated, substrate immersed from above in the calculated polydopamine solution and different surfaces of the substrate to be coated can be coated at different times with the layer-by-layer coating method. It is also possible to make a coating (patterning) with the photomasking method.

REFERENCES

1) Du, X., Li, L., Li, J., Yang, C., Frenkel, N., Welle, A., Heissler, S., Nefedov, A., Grunze, M. and Levkin, P. A. (2014), UV-Triggered Dopamine Polymerization: Control of Polymerization, Surface Coating, and Photopatterning. Adv. Mater., 26: 8029-8033

2) Lee, H.; Dellatore, S. M.; Miller, W. M.; Messersmith, P. B., Mussel-Inspired Surface Chemistry for Multifunctional Coatings. (2007), 318 (5849), 426-430.

3) Zhu, J.; Tsehaye, M. T.; Wang, J.; Uliana, A.; Tian, M.; Yuan, S.; Li, J.; Zhang, Y.; Volodin, A.; Van der Bruggen, B., A rapid deposition of polydopamine coatings induced by iron (III) chloride/hydrogen peroxide for loose nanofiltration. *Journal of Colloid and Interface Science* 2018, 523, 86-97.

4) W. Sheng, B. Li, X. Wang, B. Dai, B. Yu, X. Jia, F. Zhou, Brushing up from "anywhere" undersunlight: a universal surface-initiated polymerization from polydopamine-coated surfaces, Chemical science, 6 (2015) 2068-2073.

5) Wang, J.-I.; Li, B.-c.; Li, Z.-j.; Ren, K.-f.; Jin, L.-j.; Zhang, S.-m.; Chang, H.; Sun, Y.-x.; Ji, J., Electropolymerization of dopamine for surface modification of complex-shaped cardiovascular stents. *Biomaterials* 2014, 35 (27), 7679-7689.

The invention claimed is:

1. A method for synthesizing a polydopamine, the method comprising:
reacting dopamine and diphenyliodonium with at least one photo-stimulant, the photo-stimulant being at least one of visible light and sunlight.

2. The method of claim 1, wherein the step of reacting comprises:
reacting dopamine and diphenyliodonium in mole equal proportions.

3. The method of claim 1, wherein the step of reacting is for a period of time of between two hours and four hours.

* * * * *